United States Patent Office 2,892,827
Patented June 30, 1959

2,892,827

COPPER CONTAINING POLYAZO DYESTUFFS

Horst Nickel, Koln-Stammheim, and Fritz Suckfüll, Leverkusen, Germany, assignors to Farbenfabriken Bayer Aktiengesellschaft, Leverkusen, Germany, a corporation of Germany No Drawing. Application July 2, 1957
Serial No. 669,440

Claims priority, application Germany August 16, 1956

3 Claims. (Cl. 260—143)

The present invention relates to copper-containing polyazo dyestuffs; more particularly it relates to copper complexes of polyazo dyestuffs corresponding to the formula

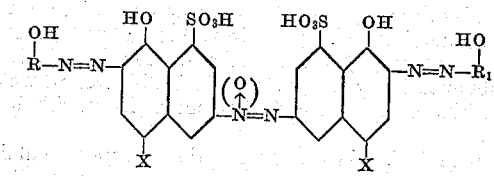

In this formula X means hydrogen or a sulfonic acid group and R and $R_1$ stand for the same or different radicals of an azo component bearing the hydroxyl group in o-position to the azo bridge.

Copper complexes of the above mentioned formula are obtainable by coupling diazotized amino nitronaphthalenes of the general formula:

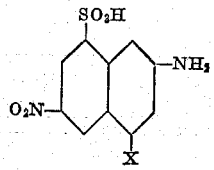

wherein X stands for a hydrogen atom or a sulfonic acid group, with azo components in o-position to an enolic or phenolic hydroxyl group, by oxidizing coppering the azo dyestuffs thus obtained and by subjecting the copper-containing nitromonoazo compounds or disazo compounds (as in Example 9) to the action of reducing agents in such a manner that 2 molecules are combined with one another with the formation of an azo or azoxy group.

The production of the copper complexes may also be effected if instead of the nitro-azo compound obtained according to the invention, the polyazo or azoxy dyestuff is coppered by oxidation at the end of the process.

For reacting the nitro-azo compounds which may be present in the form of their copper complexes with reducing agents for the purpose of linking two molecules via an azo- or azoxy group there may be used the same or different nitro-monoazo dyestuffs obtained according to the invention.

A modification of the process consists in coupling tetrazotized diaminoazo- or azoxy compounds of the general formula:

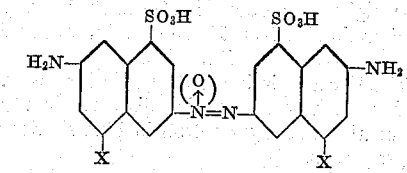

wherein X means a hydrogen atom or a sulfonic acid group, with the same or different azo components in the o-position to an enolic or phenolic hydroxyl group and by oxidizing coppering the polyazo dyestuffs thus obtained.

Coupling components suitable for the present process containing an enolic or phenolic hydroxyl group are for example: acetoacetic acid arylides, hydroxybenzenes, hydroxynaphthalenes, hydroxynaphthalene-sulfonic acids such as 2-hydroxynaphthalene-3,6-disulfonic acid, 2-hydroxynaphthalene-4-, -5-, -6-, -7- or -8-monosulfonic acid, 1-hydroxynaphthalene-4-sulfonic acid, 1-hydroxynaphthalene-3,6- or -3,8-disulfonic acid, if desired N-substituted 2-amino- or -3-amino-5-hydroxynaphthalene-7-sulfonic acid, 1,8-dihydroxynaphthalene-3,6-disulfonic acid, pyrazolones such as 1-(sulfophenyl)-3-methyl-5-pyrazolones, 1 - (4',8' - disulfonaphthyl-[2']) - 3 - methyl - 5-pyrazolone, 1-phenyl-3-carboxy-5-pyrazolone, hydroxylaryl azo compounds such as 4-hydroxybenzene-(1,1')-azo-benzene-4'-sulfonic acid or 1-hydroxy-3-sulfo-5-chloronaphthalene - [6,1'] - azo - 2' - hydroxynaphthalene-3',6'-disulfonic acid.

The oxidizing coppering of the nitro-azo compounds or of the metal-free polyazo compounds obtainable according to the invention is carried out, for example, by the methods of the examples herein.

The reductive linkage of two molecules of the nitro-azo compounds with the formation of an azo- or azoxy grouping may be effected by known methods, for example by heating the components in the presence of reducing sugars in an aqueous medium.

The new copper-containing polyazo dyestuffs are suitable for the dyeing of vegetable fibres such as cotton or of regenerated cellulose. Dyeings are thus obtained having valuable fastness properties, particularly a good fastness to light.

The following examples are given for the purpose of illustrating the invention without, however, limiting it thereto; the parts by weight and the parts by volume being in the ratio of grams to millilitres.

Example 1

30.4 parts by weight (0.1 mol) of 2-hydroxy-naphthalene-3,6-disulfonic acid are dissolved in 300 parts by volume of water and 180 parts by volume of a 20 percent sodium carbonate solution are added thereto; the solution is combined at 0–5° C. with a diazonium salt solution obtained in usual manner from 34.8 parts by weight of 2 - amino - 6 - nitronaphthalene - 4,8 - disulfonic acid. When the coupling is complete, the monoazo dyestuff thus formed is salted out with sodium chloride and isolated.

The dyestuff paste is dissolved in 1000 parts by volume of water, treated with 140 parts by volume of a 20 percent sodium acetate solution and rendered weakly acid with acetic acid (pH approximately 5.5). After the addition of a solution of 25 parts by weight of crystalline copper sulfate in 140 parts by volume of water, 280 parts by volume of a 3 percent hydrogen peroxide solution are introduced dropwise with stirring at 55–60° C. within about 3 hours and stirring is continued for 1 hour. When the dropwise addition is completed, the solution is bluish violet. The monoazo dyestuff coppered by oxidation is separated by the addition of sodium chloride and isolated.

The isolated dyestuff paste is then stirred with about 1400 parts by volume of water, treated with 140 parts by volume of sodium hydroxide solution (40° Bé.) and a solution of 17.3 parts by weight of glucose in 60 parts by volume of water, and maintained at about 50–70° C., until the reaction (the reduction of the nitro groups with the formation of an azo or azoxy bridge) is completed. The dyestuff is salted out by adding sodium chloride and isolated. It corresponds in the free acid state to the formula:

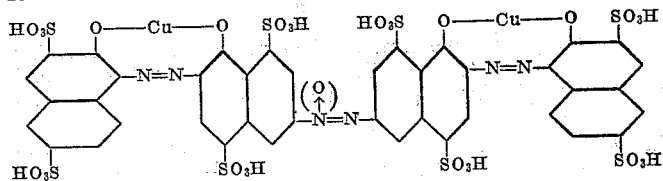

The dry dyestuff is a dark powder which dissolves in water with a blue coloration and dyes cotton in blue shades of good fastness to light and washing.

When replacing the 2-hydroxynaphthalene-3,6-disulfonic acid in this example by the amounts of the azo components listed in the following table and proceeding in an analogous manner to that described above, valuable dyestuffs are obtained which are fast to light and generally dye cotton in blue to grey shades.

| Parts by weight | Azo component | Dyeing of the copper-containing dyestuff on cotton |
|---|---|---|
| 30.4 | 1-hydroxynaphthalene-3,6-disulfonic acid | greenish grey. |
| 30.4 | 1-hydroxynaphthalene-3,8-disulfonic acid | blue. |
| 22.4 | 1-hydroxynaphthalene-4-sulfonic acid | Do. |
| 22.4 | 2-hydroxynaphthalene-4-sulfonic acid | greenish grey. |
| 22.4 | 2-hydroxynaphthalene-5-sulfonic acid | blue. |
| 22.4 | 2-hydroxynaphthalene-6-sulfonic acid | Do. |
| 22.4 | 2-hydroxynaphthalene-7-sulfonic acid | Do. |
| 22.4 | 2-hydroxynaphthalene-8-sulfonic acid | bluish grey. |
| 28.1 | 2-acetylamino-5-hydroxynaphthalene-7-sulfonic acid | greenish blue. |
| 28.1 | 3-acetylamino-5-hydroxynaphthalene-7-sulfonic acid | bluish green. |
| 31.5 | 2-phenylamino-5-hydroxynaphthalene-7-sulfonic acid | bluish grey. |
| 32.0 | 1,8-dihydroxynaphthalene-3,6-disulfonic acid | bluish green. |
| 25.4 | 1-(4'-sulfophenyl)-3-methyl-5-pyrazolone | bluish grey. |
| 38.4 | 1-(4',8'-disulfo-naphthyl-[2'])-3-meth-5-pyrazolone | Do. |
| 20.4 | 1-phenyl-3-carboxy-5-pyrazolone | Do. |
| 17.7 | acetoacetic acid anilide | reddish grey. |
| 10.8 | 1-hydroxy-4-methylbenzene | grey. |
| 34.8 | 1-hydroxy-8-ethoxy-naphthalene-3,6-disulfonic acid | greenish blue. |
| 31.9 | 2-amino-5-hydroxy-naphthalene-1,7-disulfonic acid | bluish green. |
| 27.8 | 4-hydroxybenzene-[1,1']-azobenzene-4'-sulfonic acid | brown. |

*Example 2*

The copper complex compound of the nitro-monoazo dyestuff of the formula:

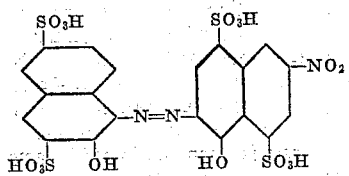

obtainable according to Example 1 by coupling 15.2 parts by weight (0.05 mol) of 2-hydroxynaphthalene-3,6-disulfonic acid with the diazo compound of 17.4 parts by weight of 2-amino-6-nitronaphthalene-4,8-disulfonic acid and subsequent treating with a copper salt and hydrogen peroxide, and the copper complex of the dyestuff having the formula:

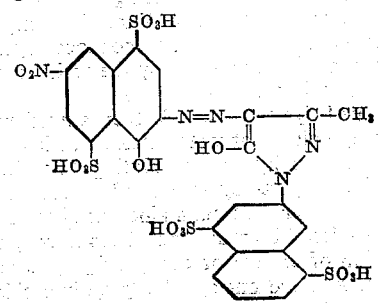

obtainable by coupling 19.2 parts by weight (0.05 mol) of 1-(4',8'-disulfonaphthyl-[2'])-3-methyl-5-pyrazolone with the diazo compound from 17.4 parts by weight of 2-amino-6-nitronaphthalene-4,8-disulfonic acid and by treating the azo dyestuff with a copper salt and hydrogen peroxide, are stirred together into 1400 parts by volume of water and the mixture is treated with 100 parts by volume of sodium hydroxide solution (40° Bé.) and a solution of 17.3 parts by weight of glucose in 60 parts by volume of water. The mixture is slowly heated to 55° C. and maintained at 55–60° C. for about 20 minutes. When the reduction of the nitro groups with the formation of the azo or azoxy bridge is completed, the product is cooled down to 25° C., salted out with sodium chloride and isolated. If desired, the isolated product is after-coppered by usual methods. The dry dyestuff thus obtained is a dark powder which dissolves in water with a blue coloration and dyes cotton in reddish blue shades.

When replacing in the last-mentioned copper-containing dyestuff of this example the azo component 1-(4',8'-disulfonaphthyl-[2'])-3-methyl-5-pyrazolone by a corresponding amount of a coupling component listed in the following table and otherwise proceeding in the same manner, dyestuffs of good fastness properties are obtained which dye cotton in blue to bluish green or greenish blue shades.

| Parts by weight | Azo component | Dyeing on cotton |
|---|---|---|
| 15.2 | 1-hydroxynaphthalene-3,6-disulfonic acid | greenish blue. |
| 11.2 | 2-hydroxynaphthalene-5-sulfonic acid | blue. |
| 8.9 | acetoacetic acid anilide | bluish grey. |
| 5.4 | 1-hydroxy-4-methylbenzene | Do. |

*Example 3*

30.4 parts by weight (0.1 mol) of 1-hydroxynaphthalene-3,6-disulfonic acid are dissolved in 300 parts by volume of water, 180 parts by volume of a 20 percent sodium carbonate solution are added thereto, and the mixture is coupled at 0–5° C. with a diazonium salt solution obtained in usual manner from 26.8 parts by weight (0.1 mol) of 2-amino-6-nitro-naphthalene-8-sulfonic acid. When the coupling is completed, the product is acidified with acetic acid and 140 parts by volume of a 20 percent sodium acetate solution are added. After adding a solution of 25 grams of crystalline copper sulfate in 140 parts by volume of water and dissolving the mixture by heating, 350 parts by volume of a 3 percent hydrogen peroxide solution are added dropwise at 60–65° C. within about 4 hours, and stirring is continued for 90 minutes. After concentration to a small volume, the dyestuff thus obtained is separated by the addition of sodium chloride and isolated.

The dyestuff paste is stirred in 1500 parts by volume of water, treated with 130 parts by volume of sodium hydroxide solution (40° Bé.) and a solution of 17.2 parts by weight of glucose in 60 parts by volume of water, and maintained at 50–60° C. for about 30 minutes, until the monoazo dyestuff can no longer be detected. The dyestuff is isolated in usual manner. After drying it is a dark powder which dissolves in water with a blue coloration and dyes cotton in blue shades of good fastness properties.

When replacing 1-hydroxynaphthalene-3,6-disulfonic acid in this example by the equivalent amount of 1- hydroxynaphthalene-3,8-disulfonic acid, 2-hydroxynaphthalene-3,6-disulfonic acid, 1-(4'-sulfophenyl)-3-methyl-5-pyrazolone, or 1-(4',8'-disulfonaphthyl-[2'])-3-methyl-5-pyrazolone, valuable dyestuffs are likewise obtained which dye cotton in blue to bluish grey shades.

*Example 4*

The copper complex of the dyestuff having the formula:

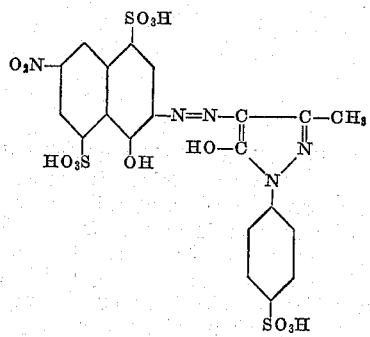

obtainable according to the instruction of Example 1 by coupling 12.7 parts by weight of 1-(4'-sulfophenyl)-3-methyl-5-pyrazolone with the diazo compound of 17.4 parts by weight of 2-amino-6-nitro-naphthalene-4,8-disulfonic acid and oxidizing coppering, and the copper complex of the dyestuff having the formula:

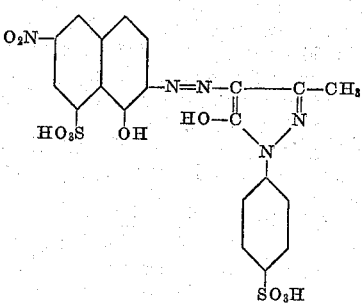

obtainable according to the instruction of Example 3 from 12.7 parts by weight of 1-(4'-sulfophenyl)-3-methyl-5-pyrazolone and the diazo compound from 13.4 parts by weight of 2-amino-6-nitro-naphthalene-8-sulfonic acid by coupling and oxidizing coppering, are stirred together in 1100 parts by volume of water, treated with 100 parts by volume of sodium hydroxide solution (40° Bé.) and 17.3 parts by weight of glucose in 60 parts by volume of water, heated to 50–60° C. and kept at this temperature, until no further monoazo dyestuff is detectable. The polyazo or -azoxy dyestuff thus obtained is isolated in usual manner. After drying, it is a dark powder which dyes cotton in grey shades.

*Example 5*

The copper complex of the dyestuff having the formula:

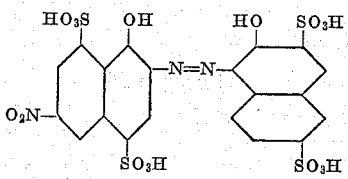

obtainable according to the instruction of Example 1 from 15.2 parts by weight (0.05 mol) of 2-hydroxynaphthalene-3,6-disulfonic acid and the diazo compound from 17.4 parts by weight of 2-amino-6-nitro-naphthalene-4,8-disulfonic acid by coupling and oxidizing coppering, and the copper complex of the dyestuff having the formula:

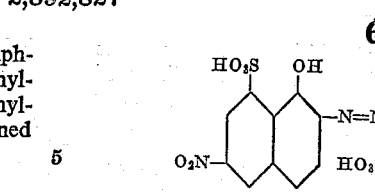

obtainable according to the instruction of Example 3 by coupling 15.2 parts by weight of 1-hydroxynaphthalene-3,6-disulfonic acid with 13.4 parts by weight of the diazo compound from 2-amino-6-nitro-naphthalene-8-sulfonic acid and subsequent oxidizing coppering, are stirred together in 1600 parts by volume of water, 150 parts by volume of sodium hydroxide solution (40° Bé.) and a solution of 17.2 parts by weight of glucose in 80 parts by volume of water are added, the mixture is slowly heated to 55–60° C. and maintained at this temperature until the reduction of the nitro groups with the formation of an azo or azoxy bridge is completed. After cooling, the product is isolated in usual manner. The dry polyazo or -azoxy dyestuff thus obtained is a dark powder which dissolves in water with a blue coloration and dyes cotton in a greenish blue shade.

*Example 6*

30.4 parts by weight (0.1 mol) of 2-hydroxynaphthalene-3,6-disulfonic acid are coupled with 34.8 parts by weight of 2-amino-6-nitro-naphthalene-4,8-disulfonic acid and isolated as indicated in Example 1. The dyestuff paste is stirred with 1800 parts by volume of water, treated with 150 parts by volume of sodium hydroxide solution (40° Bé.) and 17.3 parts by weight of glucose dissolved in 80 parts by volume of water, slowly heated to 60° C. and kept at this temperature for about 15 minutes, until no further monoazo dyestuff is detectable. The reaction mixture is rendered acid to Congo, treated with sodium chloride, and the polyazo or -azoxy dyestuff thus formed is isolated.

The dyestuff paste obtained is stirred with 2000 parts by volume of water, 140 parts by volume of a 20 percent sodium acetate solution are added, and the mixture is dissolved by heating after the addition of 25 parts by weight of crystalline copper sulfate in 150 parts by volume of water. 340 parts by volume of a 3 percent hydrogen peroxide solution are then added dropwise with stirring at 60° C. within about 3 hours, and stirring is continued for 1 hour. The dyestuff is separated by the addition of sodium chloride and isolated. The dry dyestuff is a dark powder which dissolves in water with a blue coloration. The dyestuff which corresponds to the product obtained according to Example 1 dyes cotton in blue shades.

*Example 7*

The sodium salt of 30.4 parts by weight (0.1 mol) of 2-hydroxynaphthalene-3,6-disulfonic acid is dissolved in 300 parts by volume of water, coupled in a soda-alkaline medium at 0° C. with the equivalent amount (0.05 mol) of the tetrazo compound of the diamine having the formula:

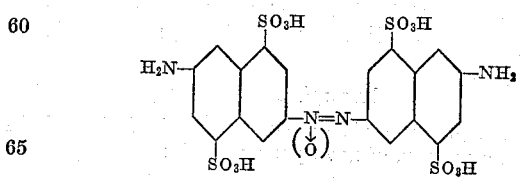

and isolated with sodium chloride.

The dyestuff paste is stirred into 2500 parts by volume of water, treated with 140 parts by volume of a 20 percent sodium acetate solution and rendered weakly acid with acetic acid. After the addition of a solution of 25 parts by weight of crystalline copper sulfate in 140 parts by volume of water, the reaction mixture is kept at 90° C. for 15 minutes. 300 parts by volume of a 3 percent hydrogen peroxide solution are then added dropwise with stirring at 60° C. within about 3 hours, the color thereby changing to blue. After the addition of hydrogen peroxide is complete, the product is stirred for a further hour, salted out with sodium chloride and isolated.

The dry dyestuff is a dark powder which dissolves in water with a blue coloration and dyes cotton in blue shades. The compound corresponds to the products obtained according to the instruction of Examples 1 and 6. The dyestuff may be decoppered by usual methods and then treated with other metal-yielding agents, for example with nickel salts.

When instead of 2-hydroxynaphthalene-3,6-disulfonic acid the equivalent amount of 1-hydroxynaphthalene-3,6,8-trisulfonic acid is used, a dyestuff is obtained which dyes cotton in a greyish blue shade.

When replacing 2-hydroxynaphthalene-3,6-disulfonic acid by the equivalent amount of 1-hydroxy-8-acetylaminonaphthalene-3,6-disulfonic acid, 2-hydroxy-8-acetylaminonaphthalene-6-sulfonic acid or 2-hydroxy-5-acetylaminonaphthalene-7-sulfonic acid, and proceeding in an analogous manner to that described before, dyestuffs are obtained which dye cotton in blue shades of good fastness to light.

*Example 8*

0.05 mol of the tetrazotized diamino compound of the formula:

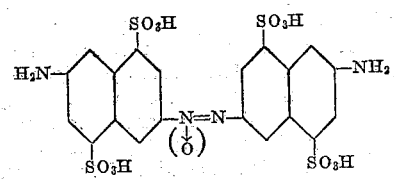

are coupled in a soda-alkaline medium with the solution of the sodium salt of 15.2 parts by weight (0.05 mol) of 2-hydroxynaphthalene-3,6-disulfonic acid at 0° C. When the coupling is complete, a soda-alkaline solution of 19.2 parts by weight (0.05 mol) of 1-(4',8'-disulfonaphthyl-[2'])-3-methyl-5-pyrazolone is added and coupled. The dyestuff paste thus obtained is stirred with 3000 parts by volume of water, rendered weakly acid with acetic acid, treated with 140 parts by volume of a 20 percent sodium acetate solution and a solution of 25 parts by weight of crystalline copper sulfate in 140 parts by volume of water and heated to 90° C. for 15 minutes. 350 parts by volume of a 3 percent hydrogen peroxide solution are added dropwise at 60° C. and a pH of about 5.5 within approximately 3 hours. When the addition is complete, the reaction mixture is stirred for another hour, the dyestuff salted out with sodium chloride and isolated. The dry dyestuff is a dark powder which dissolves in water with a blue coloration and dyes cotton in reddish blue shades.

When instead of 2-hydroxynaphthalene-3,6-disulfonic acid and 1-(4',8'-disulfonaphthyl-[2'])-3-methyl-5-pyrazolone there is used 1-hydroxynaphthalene-3,6,8-trisulfonic acid and 2-acetylamino-5-hydroxynaphthalene-7-sulfonic acid, a dyestuff is obtained which dyes cotton in greyish blue shades.

*Example 9*

(a) The sodium salt of 58.9 parts by weight (0.1 mol) of the monoazo dyestuff having the formula:

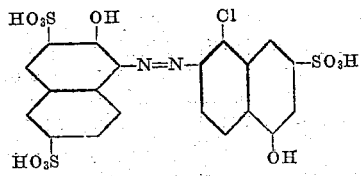

obtainable for example by diazotizing the o-benzenesulfonyl compound of 1-chloro-2-amino-5-hydroxynaphthalene-7-sulfonic acid, coupling with 2-hydroxynaphthalene-3,6-disulfonic acid and subsequent alkaline saponification, are dissolved in 600 parts by volume of water and combined in a soda-alkaline medium at 0° C. with a solution of the diazo compound of 34.8 parts by weight of 2-amino-6-nitronaphthalene-4,8-disulfonic acid. When the coupling is complete, the disazo dyestuff thus formed corresponding to the formula:

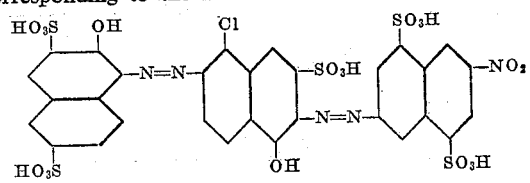

is salted out with sodium chloride and isolated.

(b) The dyestuff paste obtained is stirred into 1450 parts by volume of water, rendered weakly acid (pH appr. 5.5) with acetic acid, and dissolved with heating with 140 parts by volume of a 20 percent sodium acetate solution and a solution of 30 parts by weight of crystalline copper sulfate in 200 parts by volume of water. About 350 parts by volume of a 3 percent hydrogen peroxide solution are then added dropwise at 55–60° C. and a pH of appr. 5.5, until the reaction is complete. The disazo dyestuff thus coppered by oxidation is precipitated with sodium chloride and isolated.

(c) The isolated dyestuff paste is then stirred into about 600 parts by volume of water, treated with 60 parts by volume of a 40 percent by volume sodium hydroxide solution and a solution of 17.3 parts by weight of glucose in 60 parts by volume of water, and kept at about 60° C., until the reaction is complete. The dyestuff is isolated in usual manner and, if desired, aftercoppered by usual methods.

After drying, it is a dark powder which dissolves in water with a blue coloration and dyes cotton in greenish grey shades.

The dyestuff may also be obtained by diazotizing 2-amino-6-nitronaphthalene-4,8-disulfonic acid and coupling with 1-chloro-2-amino-5-hydroxynaphthalene-7-sulfonic acid in the o-position to the 5-standing hydroxy group, further diazotizing the monoazo dyestuff thus obtained, coupling with 2-hydroxynaphthalene-3,6-disulfonic acid, coppering the disazo dyetuff thus obtained by oxidation as described above, subjecting it to an alkaline treatment with glucose, and, if desired, subsequent coppering.

If treating the copper-containing nitro-disazo dyestuff according to Example 9(b) with 0.1 mol of the dyestuff corresponding to the formula

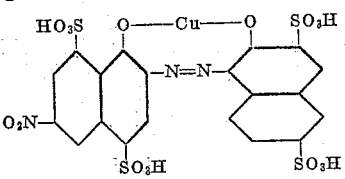

which is obtained in accordance with the method described in Example 1, with glucose in alkaline medium and coppering in alkaline medium a tetradisazo dyestuff is obtained which dyes cotton in blue-grey shades.

*Example 10*

100 parts by weight of cotton are introduced at room temperature into a dye bath containing 4000 parts by volume of water, 2 parts by weight of the dyestuff described in Example 1 (prepared by using 2-hydroxynaphthalene-3,6-disulfonic acid as coupling component), 1 part by weight of sodium carbonate and 20 parts by weight of sodium sulfate. The dye bath is heated within 30 minutes up to 90° C. and maintained at 90–95° C. for 30 minutes. After rinsing with water and drying a blue dyeing is obtained which is very fast to light.

We claim:
1. A copper complex of polyazo dyestuffs corresponding to the formula

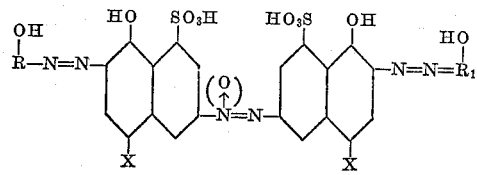

wherein R and $R_1$ stand for radicals of a coupling component selected from the group consisting of the benzene, naphthalene, pyrazolone, aceto acetic-acid anilide, azobenzene and azo-naphthalene series, said radicals bearing the hydroxyl group in o-position to the azo bridge and X means a member selected from the group consisting of hydrogen and a sulfonic acid group.

2. The copper complex of the polyazo dyestuff corresponding to the formula

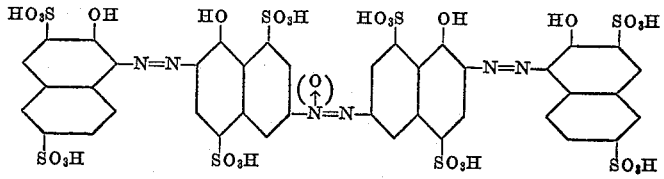

3. The copper complex of the polyazo dyestuff corresponding to the formula

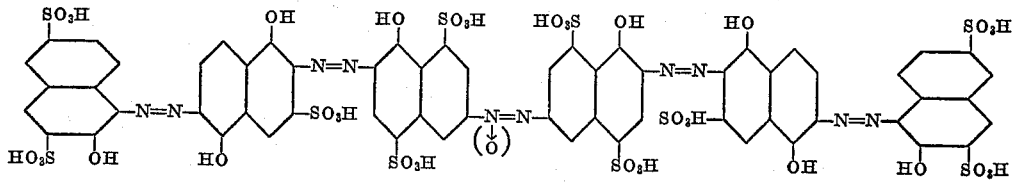

References Cited in the file of this patent

UNITED STATES PATENTS

| | | |
|---|---|---|
| 709,186 | Weinberg et al. | Sept. 16, 1902 |
| 1,788,797 | Jordan | Jan. 13, 1931 |
| 1,819,080 | Dewey | Aug. 18, 1931 |

FOREIGN PATENTS

| | | |
|---|---|---|
| 670,522 | Great Britain | Apr. 23, 1952 |

OTHER REFERENCES

Venkataraman, K.: "Synthetic Dyes," volume I, p. 544.